(12) United States Patent
Sul et al.

(10) Patent No.: US 12,440,065 B2
(45) Date of Patent: Oct. 14, 2025

(54) AUTOMATIC OIL FILTERING FRYER

(71) Applicants: Andy Sul, Hawaiian Gardens, CA (US); Dabin Sul, Alhambra, CA (US)

(72) Inventors: Andy Sul, Hawaiian Gardens, CA (US); Dabin Sul, Alhambra, CA (US)

( * ) Notice: Subject to any disclaimer, the term of this patent is extended or adjusted under 35 U.S.C. 154(b) by 742 days.

(21) Appl. No.: 17/865,323

(22) Filed: Jul. 14, 2022

(65) Prior Publication Data
US 2023/0320528 A1 Oct. 12, 2023

(30) Foreign Application Priority Data
Apr. 12, 2022 (KR) .................. 10-2022-0044879

(51) Int. Cl.
*A47J 37/12* (2006.01)

(52) U.S. Cl.
CPC ....... *A47J 37/1223* (2013.01); *A47J 37/1266* (2013.01); *A47J 37/1285* (2013.01)

(58) Field of Classification Search
CPC ................ A47J 31/1223; A47J 31/1285; A47J 37/1223; A47J 37/1285
USPC .......................... 210/167.28, DIG. 8; 99/408
See application file for complete search history.

(56) References Cited

U.S. PATENT DOCUMENTS

| | | | | |
|---|---|---|---|---|
| 4,210,123 A * | 7/1980 | Moore | ................ | A47J 37/1223 210/DIG. 8 |
| 6,955,118 B1 * | 10/2005 | Bivens | ................ | A47J 37/1285 210/DIG. 8 |
| 7,311,038 B2 * | 12/2007 | Savage | ................ | A47J 37/1223 210/DIG. 8 |
| 2005/0223909 A1 * | 10/2005 | Kurata | ................ | A47J 37/1271 99/408 |
| 2008/0213445 A1 * | 9/2008 | Feinberg | ............. | A47J 37/1223 99/336 |
| 2013/0075347 A1 * | 3/2013 | Bernard | ................ | B01D 29/07 210/767 |
| 2014/0102319 A1 * | 4/2014 | Tassan-Mangina | ......................... | A47J 37/1223 210/167.28 |

* cited by examiner

*Primary Examiner* — Reginald Alexander (57) ABSTRACT

The present invention provides an automatic oil filtering fryer comprising: a frying oil container filled with oil; a heating unit heating the oil; an oil filtering container receiving the oil from the frying oil container through an oil discharging pipe; an oil level and filtration control valve installed on the oil discharging pipe and controlling an oil level and filtration; a filtering device installed inside the oil filtering container and including a filtering mesh and a frame to filter debris in the oil; a filtering paper installed inside the oil filtering container and filters remaining debris in the oil; an oil supplying pipe transferring the filtered oil from the oil filtering container into the frying oil container; and a propeller pump pumping the filtered oil upward to the frying oil container and equipping with blades pulverizing remaining debris in the filtered oil while rotating.

14 Claims, 8 Drawing Sheets

AUTOMATIC OIL FILTERING FRYER

FIELD OF THE INVENTION

The present invention relates to a fryer, and more particularly to a fryer equipping with a function of treating oil.

BACKGROUND OF THE INVENTION

Recently, as diverse food cultures are widely spread and created in many ways, fried foods such as fried chicken and fast food becomes popular all over the world, and various cooking oils used to fry food are being introduced. High quality cooking oils, which are expensive, such as olive oil, are also emerging for taste and health of food. Accordingly, some restaurants or households that use a large amount of cooking oil reuse the cooking oils to avoid burden of high cost of cooking oils.

Specifically, in some restaurants, after pouring new cooking oil into an oil tank of a fryer, the oil is repeatedly used in the fryer many times. However, as the use of the cooking oil is repeated, taste of food can change, or an unhealthy substance can be generated while cooking due to food carbonization caused by frying residue floating in the frying oil. Therefore, with conventional fryers, there is a limitation in frying food by using cooking oil multiple times, and it is necessary to discard cooking oil that has been used several times and to repurchase new cooking oil frequently.

As described above, repeated use of cooking oil reduces the taste of food and generates substances harmful to health. In addition, repurchasing cooking oil gives cost burden to users, and disposing of cooking oil causes resource wastes and environmental pollution.

The present invention has been devised to solve the problems described above, and the object of the present invention is to provide an automatic oil filtering fryer that is configured to have a simple structure occupying a small space with an automatic oil refining function, thereby increasing user convenience and time efficiency, producing healthy and tasty food with clean cooking oil, reducing food producing cost, and preventing waste and environmental pollution.

SUMMARY OF THE INVENTION

According to one embodiment of the present invention, an automatic oil filtering fryer 10 comprises: a frying oil container 103 that is filled with oil O0 and that an ingredient is to be contained into; a heating unit 105 installed inside the frying oil container 103 and heating the oil O0; an oil filtering container 107 located below the frying oil container 103 and receiving the oil O0 that is discharged from the frying oil container 103 through an oil discharging pipe 109; the oil discharging pipe 109 transferring the oil O0 discharged from the frying oil container 103 into the oil filtering container 107; a filtering device 111 that is installed inside the oil filtering container 107 and configured to include a filtering mesh 111m and a frame 111f that surrounds an edge of the filtering mesh 111m to filter first debris contained in the oil O0, thereby forming a first filtered oil O1; a filtering paper 113 that is installed inside the oil filtering container 107 and filters second debris contained in the first filtered oil O1, thereby forming second filtered oil O2; and an oil supplying pipe 115 transferring the second filtered oil O2 discharged from the oil filtering container 107 into the frying oil container 103.

In addition, the automatic oil filtering fryer 10 may further comprise: an oil level and filtration control valve 110 that is installed on the oil discharging pipe 109 and controls the oil O0 in the frying oil container 103 to be discharged, and an oil supplying pump 117 that is installed inside the oil supplying pipe 115 and that pumps to raise the second filtered oil O2 upward, thereby enabling automatic oil filtering circulation through the frying oil container 103, the oil discharging pipe 109, the oil filtering container 107, the filtering device 111, the filtering paper 113, the oil supplying pipe 115, and the frying oil container 103.

Furthermore, the automatic oil filtering fryer 10 may further comprising an oil discharging pump 118 that is installed inside the oil discharging pipe 109 and that pumps to induce the oil O0 to flow downward from the frying oil container 103 into the oil filtering container 107 through the oil discharging pipe 109, thereby enabling the automatic oil filtering circulation.

The filtering mesh 111m may be made of metal based wires and the frame 111f is made of elvan. In this case, a hole formed by adjacent wires of the filtering mesh 111m may be bigger than a hole formed by adjacent fibers of the filtering paper 113, wherein the filtering device 111 on which the first debris is removably placed is permanently reusable after removing the filtered first debris.

In addition, the automatic oil filtering fryer 10 may further comprise an oil level and filtration control valve 110 that is installed on the oil discharging pipe 109, wherein the oil level and filtration control valve 110 controls an oil level of the frying oil container 103 to prevent the oil O0 from overflowing from the frying oil container 103 and controls filtration of the oil O0 of the frying oil container 103.

Moreover, the automatic oil filtering fryer 10 may further comprise an oil level sensor 120 that is installed inside the frying oil container 103 and detects an oil level of the frying oil container 103.

The oil level control valve 110 may control the oil level of the frying oil container 103 at a predetermined limit level LL, regardless of a volume of the ingredient contained in the frying oil container 103.

In addition, the automatic oil filtering fryer 10 may further comprise an oil supplying pump 117 that is installed inside the oil supplying pipe 115 and that pumps to raise the second filtered oil O2 upward from the oil filtering container 107 and supplies the second filtered oil O2 into the oil filtering container 107 through the oil supplying pipe 115.

The oil supplying pump 117 may include: a motor 117m providing rotational power; a shaft 117s one end of which is connected to the motor 117m and rotates according to rotation of the motor 117m; a circular plate 117p connected to the other end of the shaft 117s and rotating according to rotation of the shaft 117s; and a plurality of blades 117b coupled onto the circular plate 117p. In this case, the circular plate 117p may have a first surface and a second surface opposite to the first surface, wherein the shaft 117s is connected to the first surface of the circular plate 117p, and the plurality of blades 117b are fixedly coupled to the second surface of the circular plate 117p.

While the second filtered oil O2 is raised upward through the oil supplying pipe 115 by the rotational power of the oil supplying pump 117, the plurality of rotating blades 117b may pulverize third debris contained in the second filtered oil O2 to powder, thereby forming third filtered oil O3, wherein the third filtered oil O3 is supplied to the frying oil container 103.

In addition, the automatic oil filtering fryer 10 may further comprise an oil discharging pump 118 that is installed inside the oil discharging pipe 109 and that pumps to induce the oil O0 to flow downward from the frying oil container 103 into the oil filtering container 107 through the oil discharging pipe 109.

The oil discharging pump 118 may include: a motor 118*m* providing rotational power; a shaft 118*s* one end of which is connected to the motor 118*m* and rotates according to rotation of the motor 118*m*; a circular plate 118*p* connected to the other end of the shaft 118*s* and rotating according to rotation of the shaft 118*s*; and a plurality of blades 118*b* coupled onto the circular plate 118*p*, wherein while the oil O0 comes downward through the oil discharging pipe 109 by the rotational power of the oil discharging pump 118, the plurality of rotating blades 118*b* pulverizes debris contained in the oil O0, wherein the oil O0 containing pulverized debris is supplied to the oil filtering container 107.

Furthermore, the automatic oil filtering fryer 10 may further comprise a thermometer 119 and an oil level sensor 120 both installed inside the frying oil container 103; an oil level and filtration control valve 110 installed on the oil discharging pipe 109; an oil discharging pump 118 installed inside the oil discharging pipe 109 and pumping to induce the oil O0 to flow downward; and an oil supplying pump 117 installed inside the oil supplying pipe 115 and pumping to raise the second filtered oil O2 upward.

In addition, the automatic oil filtering fryer 10 may further comprise a controller 200 including: a control circuit 201 that receives temperature information in the frying oil container 103, oil level information in the frying oil container 103, oil level and filtration control valve information, heating unit information, oil discharging pump information, and oil supplying pump information, from a thermometer 119, the oil level sensor 120, the oil level and filtration control valve 110, the heating unit 105, and the oil supplying pump 117, and the oil discharging pump 118, respectively, that transmits all the information to a control panel 203, and that controls the oil level control valve 110, the heating unit 105, the oil supplying pump 117, and the oil discharging pump 118 automatically according to predetermined settings or manually according to manipulation of the control panel 203 by a user, and the control panel 203 that has a display 203*a* displaying the all the information, a heating control unit 203*b*, a valve control unit 203*c*, a supplying pump control unit 203*d*, and a discharging pump control unit 203*e*, which enables a user to control the oil level control valve 110, the heating unit 105, the oil supplying pump 117, and the oil discharging pump 118 by manual manipulation thereof.

According to another embodiment of the present invention, an automatic oil filtering fryer 10 comprises: a frying oil container 103 that is filled with oil O0 and that an ingredient is to be contained into; a heating unit 105 heating the oil O0; an oil filtering container 107 receiving the oil O0 discharged from the frying oil container 103 through an oil discharging pipe 109; an oil level and filtration control valve 110 that is installed on the oil discharging pipe 109 and controls the oil O0 in the frying oil container 103 to be discharged; an oil level sensor 120 that is installed inside the frying oil container 103 and detects an oil level of the frying oil container 103; a filtering device 111 that is installed inside the oil filtering container 107 and configured to include a filtering mesh 111*m* to filter debris contained in the oil O0, thereby forming a first filtered oil O1; a filtering paper 113 that is installed inside the oil filtering container 107 and filters remaining debris contained in the first filtered oil O1, thereby forming second filtered oil O2; an oil supplying pipe 115 transferring the second filtered oil O2 into the frying oil container 103, wherein the oil level control valve 110 controls the oil level of the frying oil container 103 at a predetermined limit level LL, regardless of a volume of the ingredient contained in the frying oil container 103, to prevent the oil O0 from overflowing from the frying oil container 103 and controls filtration of the oil O0 of the frying oil container 103.

In addition, the automatic oil filtering fryer 10 may further comprise an oil supplying pump 117 that is installed inside the oil supplying pipe 115 and that pumps to raise the second filtered oil O2 upward, thereby enabling automatic oil filtering circulation through the frying oil container 103, the oil discharging pipe 109, the oil filtering container 107, the filtering device 111, the filtering paper 113, the oil supplying pipe 115, and the frying oil container 103. In this case, the oil supplying pump 117 may include: a motor 117*m* providing rotational power; a shaft 117*s* one end of which is connected to the motor 117*m* and rotates according to rotation of the motor 117*m*; a circular plate 117*p* connected to the other end of the shaft 117*s* and rotating according to rotation of the shaft 117*s*; and a plurality of blades 117*b* coupled onto the circular plate 117*p*, wherein while the second filtered oil O2 is raised upward through the oil supplying pipe 115 by the rotational power of the oil supplying pump 117, the plurality of rotating blades 117*b* pulverizes third debris contained in the second filtered oil O2 to powder, thereby forming third filtered oil O3, wherein the third filtered oil O3 is supplied to the frying oil container 103.

Moreover, the automatic oil filtering fryer 10 may further comprise an oil discharging pump 118 that is installed inside the oil discharging pipe 109 and that pumps to induce the oil O0 to flow downward from the frying oil container 103 into the oil filtering container 107 through the oil discharging pipe 109, wherein the oil discharging pump 118 includes: a motor 118*m* providing rotational power; a shaft 118*s* one end of which is connected to the motor 118*m* and rotates according to rotation of the motor 118*m*; a circular plate 118*p* connected to the other end of the shaft 118*s* and rotating according to rotation of the shaft 118*s*; and a plurality of blades 118*b* coupled onto the circular plate 118*p*, wherein while the oil O0 comes downward through the oil discharging pipe 109 by the rotational power of the oil discharging pump 118, the plurality of rotating blades 118*b* pulverizes debris contained in the oil O0, wherein the oil O0 containing pulverized debris is supplied to the oil filtering container 107.

According to another embodiment of the present invention, an automatic oil filtering fryer comprises: a frying oil container 103 that is filled with oil O0 and that an ingredient is to be contained into; a heating unit 105 heating the oil O0; an oil filtering container 107 receiving the oil O0 discharged from the frying oil container 103 through an oil discharging pipe 109; an oil discharging pump 118 that is installed inside the oil discharging pipe 109 and that pumps to induce the oil O0 to flow downward from the frying oil container 103 into the oil filtering container 107 through the oil discharging pipe 109, a filtering device 111 that is installed inside the oil filtering container 107 and configured to include a filtering mesh 111*m* to filter debris contained in the oil O0, thereby forming a first filtered oil O1; a filtering paper 113 that is installed inside the oil filtering container 107 and filters remaining debris contained in the first filtered oil O1, thereby forming second filtered oil O2; an oil supplying pipe 115 transferring the second filtered oil O2 into the frying oil container 103; and an oil supplying pump 117 that is installed inside the oil supplying pipe 115 and that pumps to raise the second filtered oil O2 upward, thereby enabling automatic oil filtering circulation through the frying oil container 103, the oil discharging pipe 109, the oil filtering container 107, the filtering device 111, the filtering paper 113, the oil supplying pipe 115, and the frying oil container 103.

In addition, each of the oil discharging pump 118 and the oil supplying pump 117 respectively may include: a motor 118$m$, 117$m$ providing rotational power; a shaft 118$s$, 117$s$ one end of which is connected to the motor 118$m$, 117$m$ and rotates according to rotation of the motor 118$m$, 117$m$; a circular plate 118$p$, 117$p$ connected to the other end of the shaft 118$s$, 117$s$ and rotating according to rotation of the shaft 118$s$, 117$s$; and a plurality of blades 118$b$, 117$b$ coupled onto the circular plate 118$p$, 117$p$, wherein while the oil O0 comes downward through the oil discharging pipe 109 by the rotational power of the oil discharging pump 118, the plurality of rotating blades 118$b$ pulverizes debris contained in the oil O0, wherein the oil O0 containing pulverized debris is supplied to the oil filtering container 107, wherein while the second filtered oil O2 is raised upward through the oil supplying pipe 115 by the rotational power of the oil supplying pump 117, the plurality of rotating blades 117$b$ pulverizes third debris contained in the second filtered oil O2 to powder, thereby forming third filtered oil O3, wherein the third filtered oil O3 is supplied to the frying oil container 103.

Furthermore, the automatic oil filtering fryer 10 may further comprises an oil level and filtration control valve 110 that is installed on the oil discharging pipe 109 and controls the oil O0 in the frying oil container 103 to be discharged; and an oil level sensor 120 that is installed inside the frying oil container 103 and detects an oil level of the frying oil container 103.

BRIEF DESCRIPTION OF THE DRAWINGS

FIGS. 4$a$ and 4$b$ are respectively a bottom view and a side view illustrating an oil supplying pump 117 of the automatic oil filtering fryer 10 according to the embodiment of the present invention.

DETAILED DESCRIPTION EMBODIMENTS OF THE INVENTIONS

Hereinafter, preferred embodiments according to the present invention will be described in detail in conjunction with the accompanying drawings.

Reference will now be made in detail to the preferred embodiments of the present invention, examples of which are illustrated in the accompanying drawings, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

In addition, as used in the specification including the appended claims, the singular forms "a", "an", and "the" include the plural, and reference to a particular numerical value includes at least that particular value, unless the context clearly dictates otherwise. Ranges may be expressed herein as form "about" or "approximately" one particular value and/or to "about" or "approximately" another particular value. When such a range is expressed, another embodiment includes from the one particular value and/or to the other particular value. Similarly, when values are expressed as approximations, by use of the antecedent "about", it will be understood that the particular value forms another embodiment.

Figure 1:
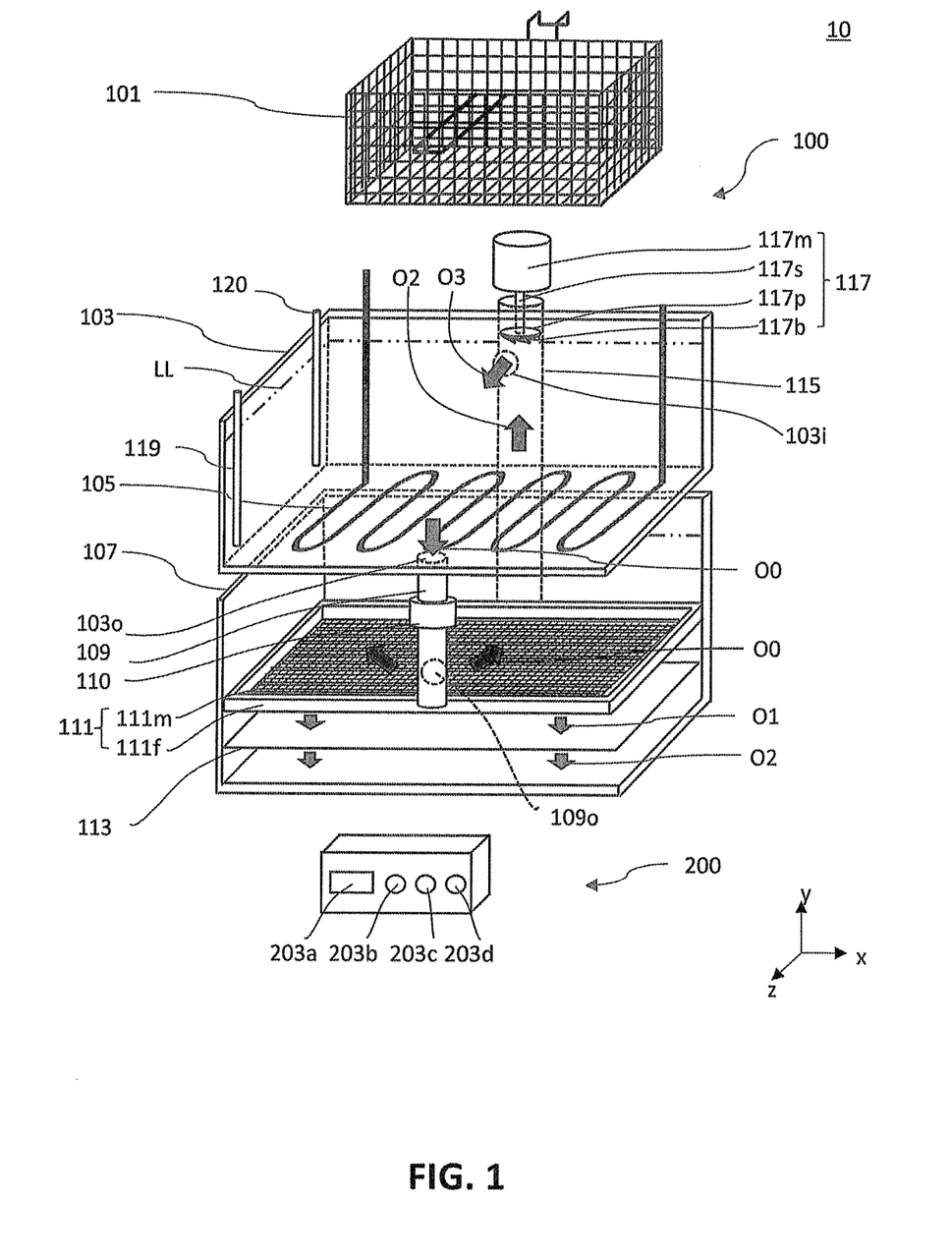
FIG. 1 is a schematic exploded perspective view illustrating an internal structure of an automatic oil filtering fryer 10 according to an embodiment of the present invention.
Figure 2:
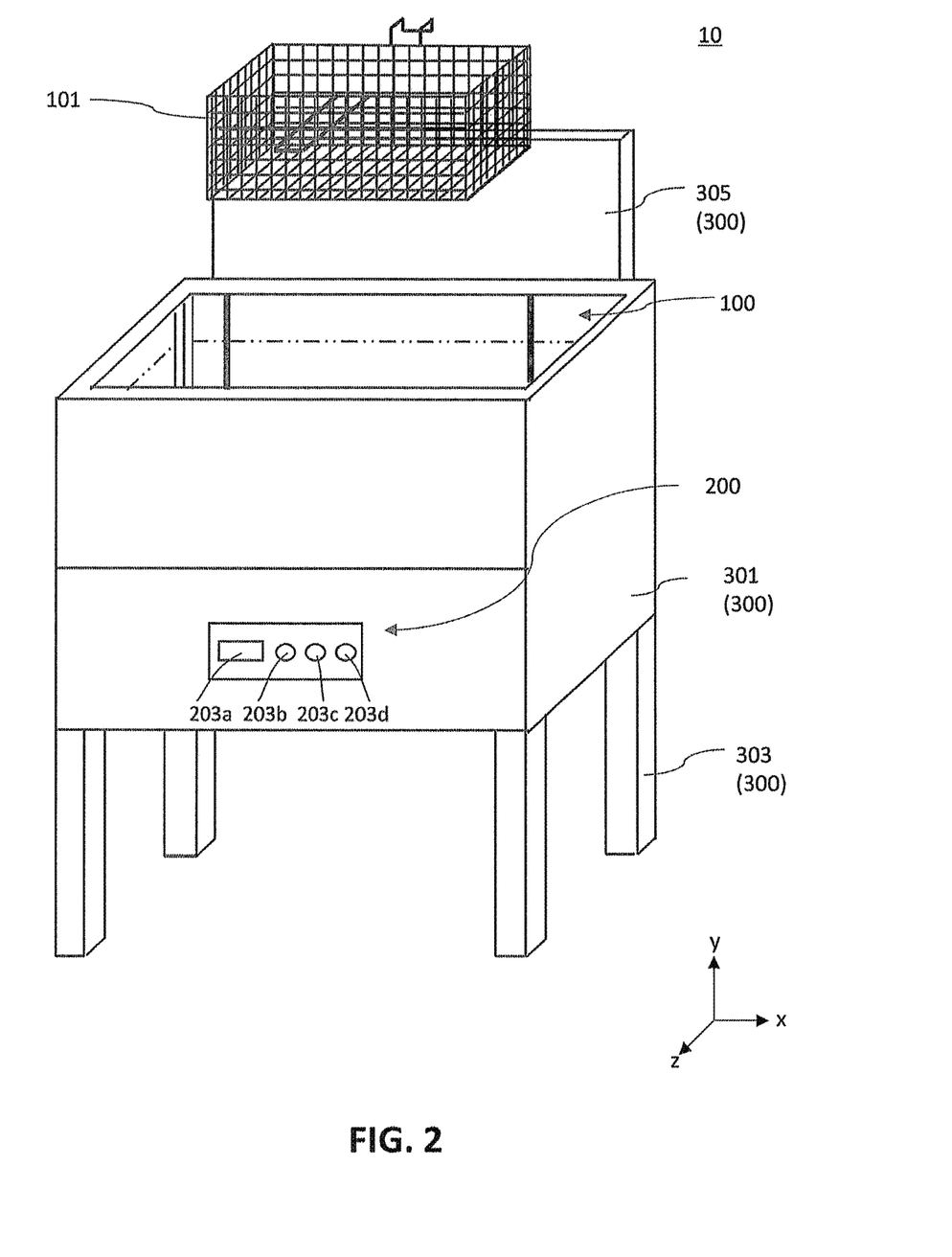
FIG. 2 is a schematic perspective view illustrating an external appearance of an automatic oil filtering fryer 10 according to the embodiment of the present invention.
Figure 3:
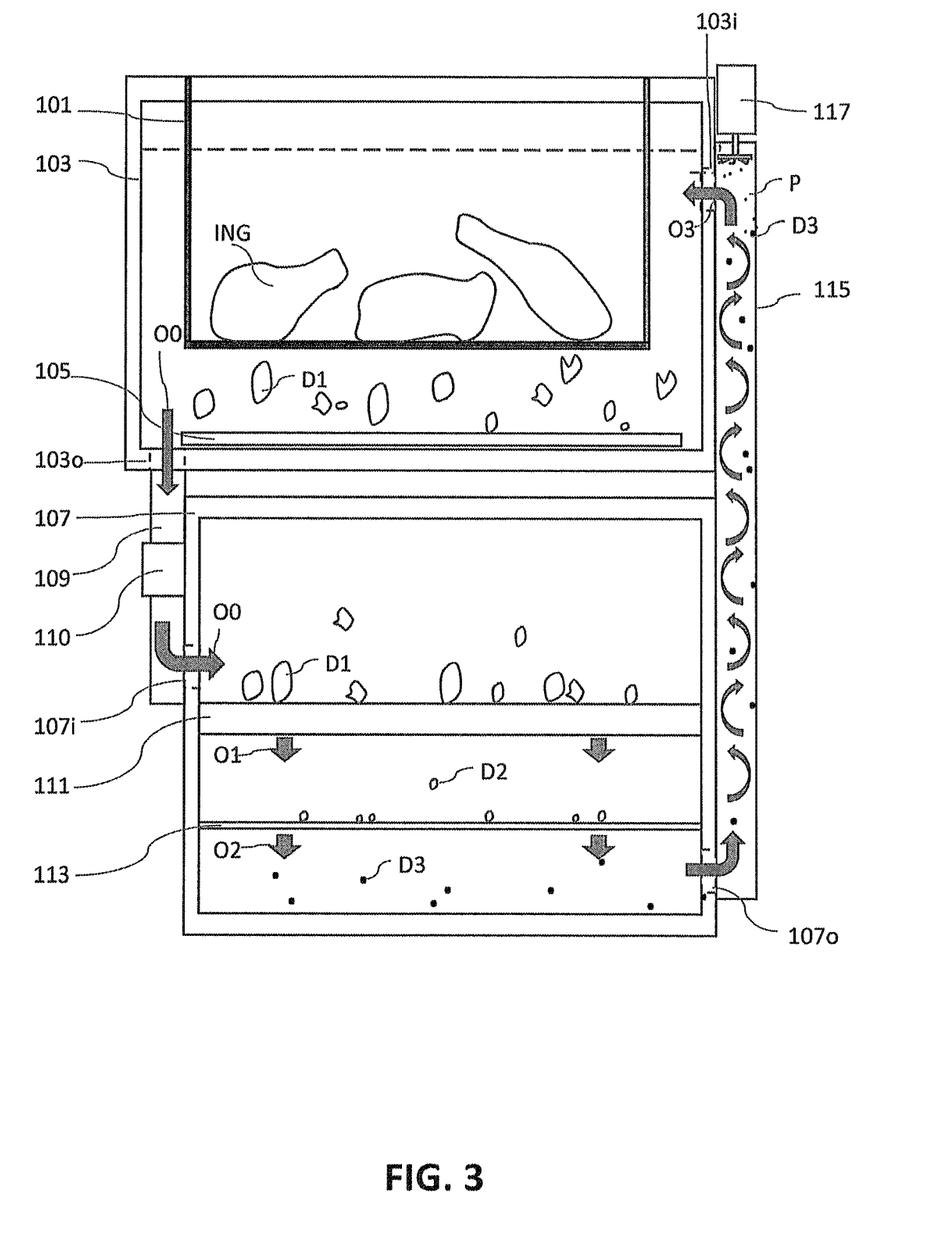
FIG. 3 is a cross sectional view illustrating an automatic oil filtering fryer 10 according to the embodiment of the present invention.
Figure 4A:
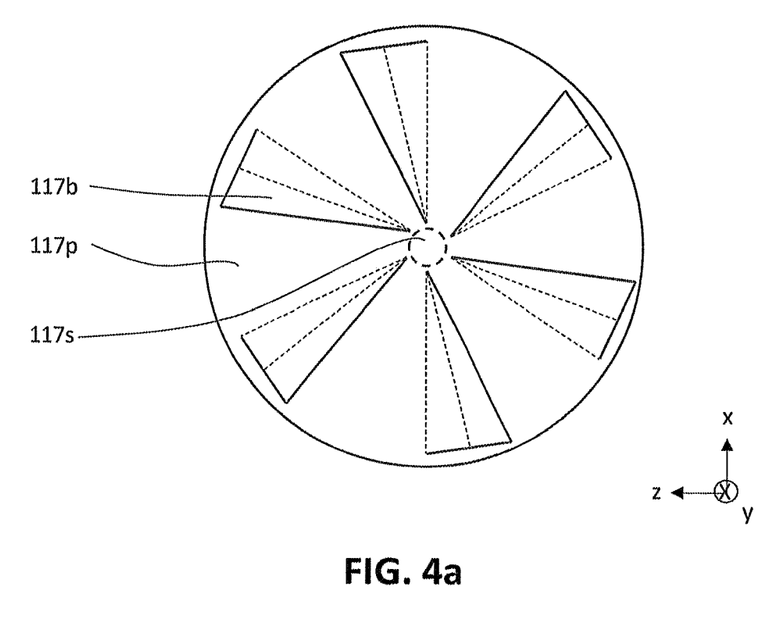
Figure 4B:
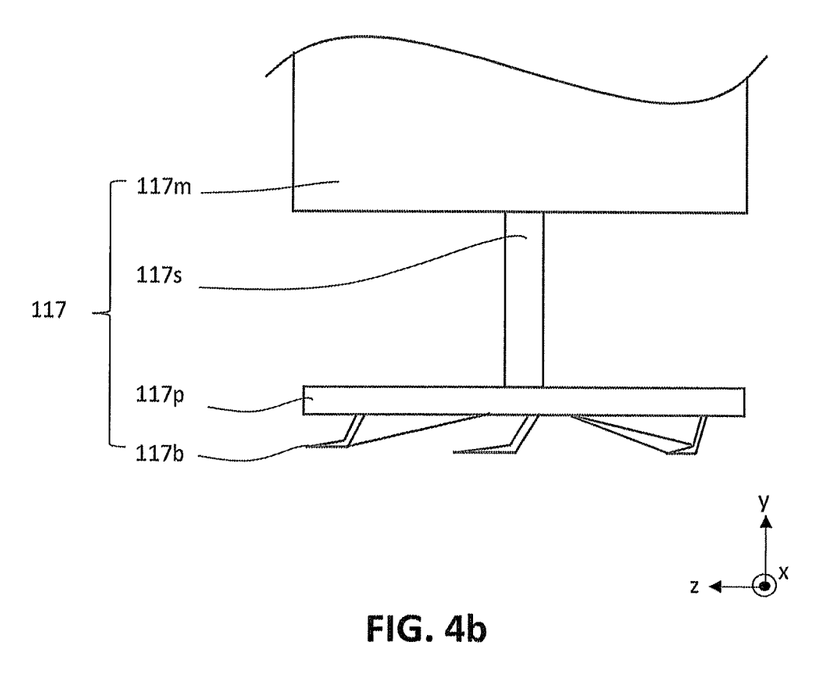
Figure 5:
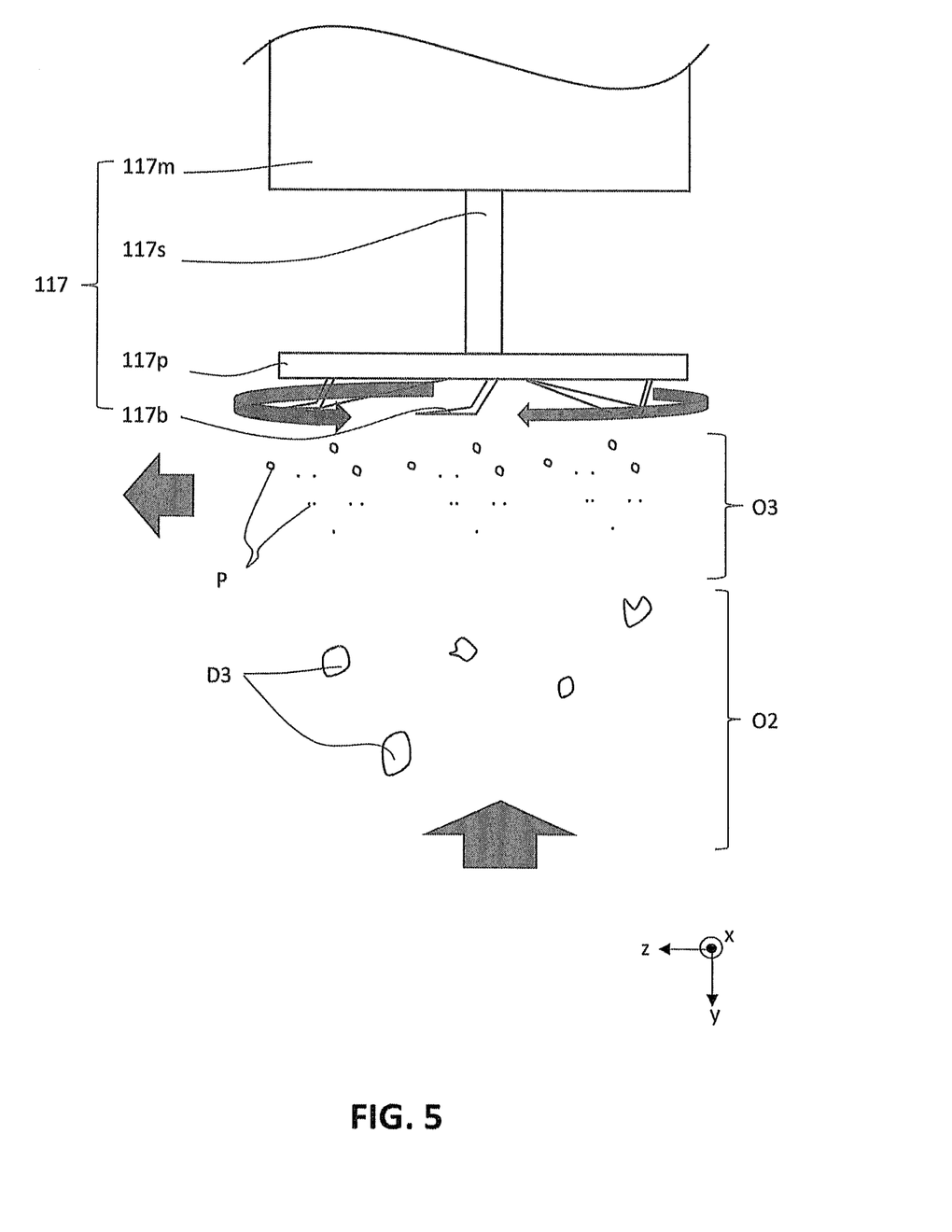
FIG. 5 is a drawing illustrating an operation of an oil supplying pump 117 of the automatic oil filtering fryer 10 according to the embodiment of the present invention.
Figure 6:
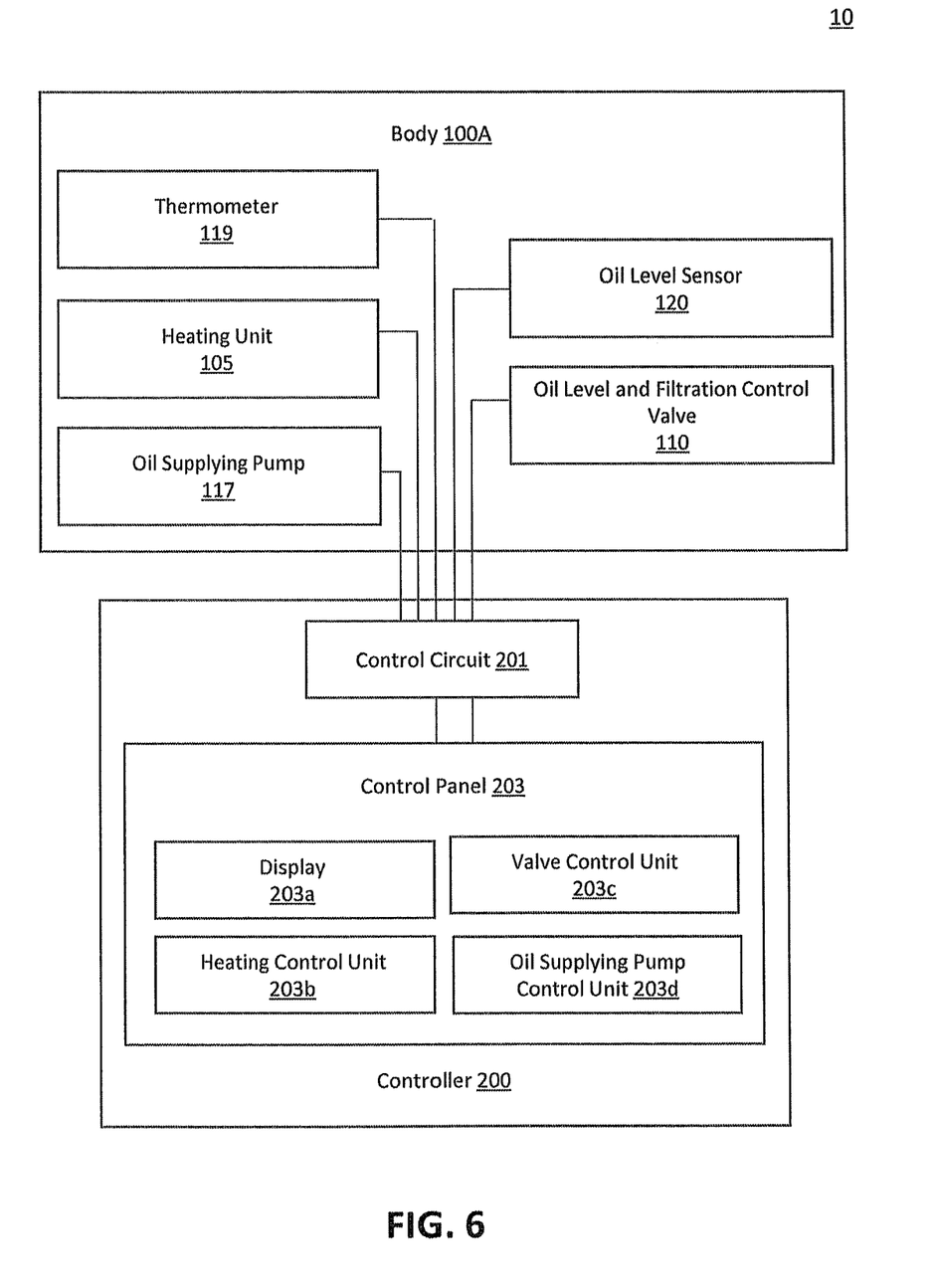
FIG. 6 is a diagram illustrating an automatic oil filtering fryer 10 according to the embodiment of the present invention.
Figure 7:
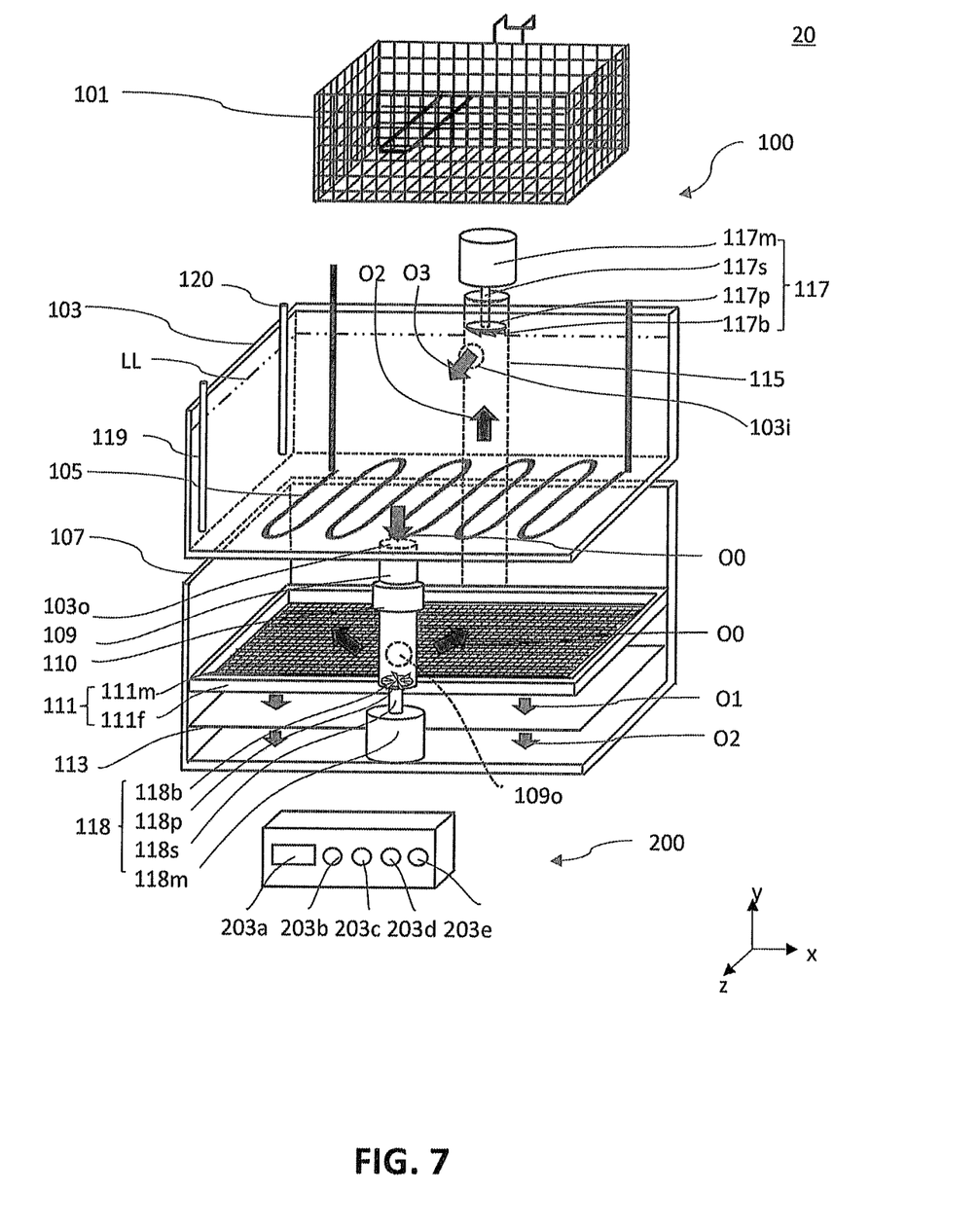
FIG. 7 is a schematic exploded perspective view illustrating an internal structure of an automatic oil filtering fryer 20 according to another embodiment of the present invention.
Figure 8:
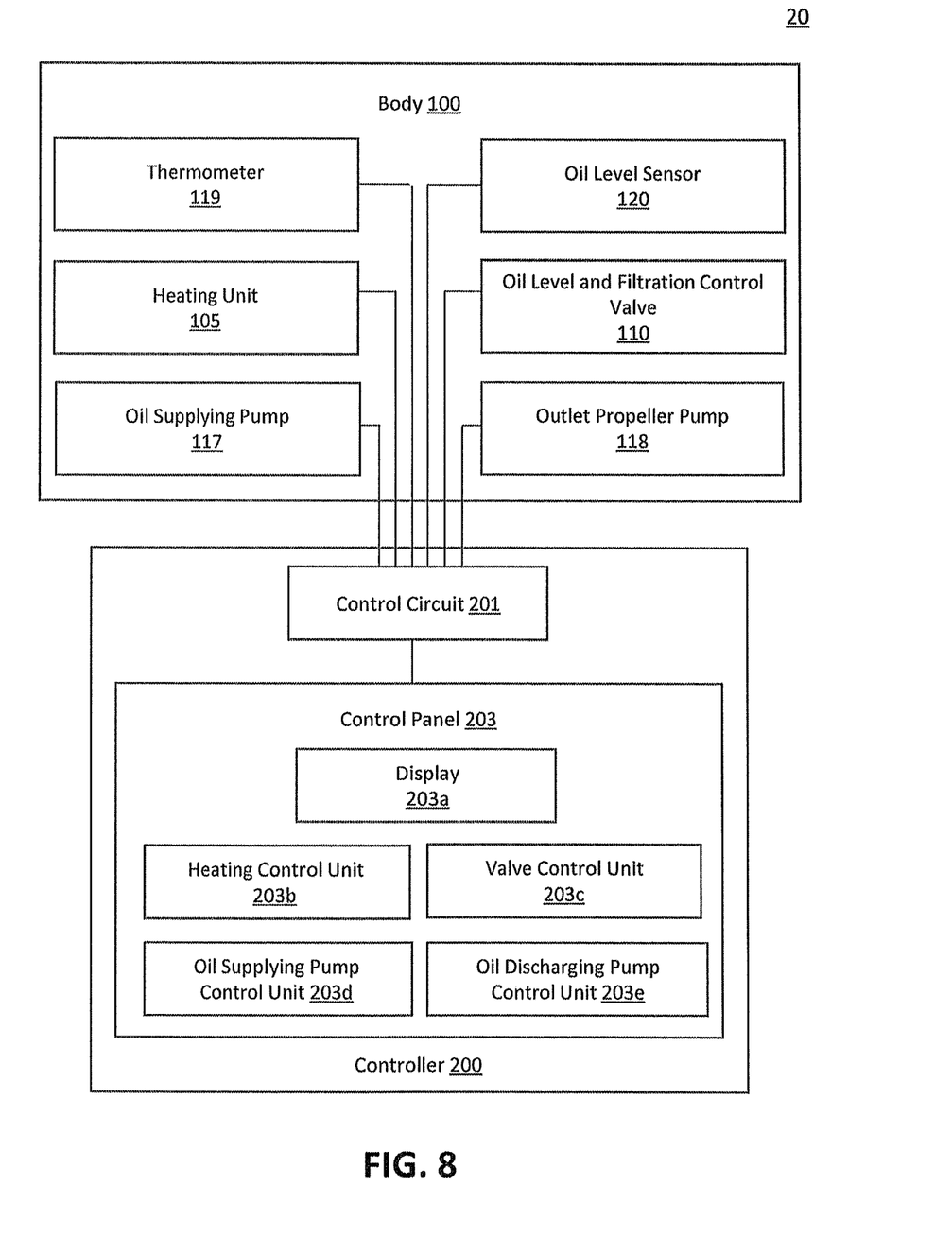
FIG. 8 is a diagram illustrating an automatic oil filtering fryer 20 according to the embodiment of the present invention.

FIG. 1 is a schematic exploded perspective view illustrating an internal structure of an automatic oil filtering fryer 10 according to an embodiment of the present invention. FIG. 2 is a schematic perspective view illustrating an external appearance of an automatic oil filtering fryer 10 of FIG. 1. FIG. 3 is a cross sectional view illustrating an automatic oil filtering fryer 10 of FIGS. 1 and 2. FIGS. 4$a$ and 4$b$ are respectively a bottom view and a side view illustrating an oil supplying pump 117 of the automatic oil filtering fryer 10 of FIGS. 1 and 2. FIG. 5 is a drawing illustrating an operation of an oil supplying pump 117 of the automatic oil filtering fryer 10 of FIGS. 1 and 2. FIG. 6 is a diagram illustrating an automatic oil filtering fryer 10 of FIGS. 1 and 2. FIG. 7 is a schematic exploded perspective view illustrating an internal structure of an automatic oil filtering fryer 20 according to another embodiment of the present invention. FIG. 8 is a diagram illustrating an automatic oil filtering fryer 20 of FIG. 7.

The automatic oil filtering fryer 20 of FIGS. 7 and 8 is the similar structure to the automatic oil filtering fryer 10 of FIGS. 1 to 6 but has a difference in that it further comprises an oil discharging pump 118 in a body 100 and a discharging pump control unit 203$e$ in a control panel 203 of a controller 200. Therefore, in the explanation of the automatic oil filtering fryer 20, common components, elements, or functions between the automatic oil filtering fryer 10 and the automatic oil filtering fryer 20 will be omitted to avoid redundancy, and only different components, elements, or functions from the automatic oil filtering fryer 10 will be described.

Referring to FIGS. 1 to 3, the automatic oil filtering fryer 10 comprises: a body 100 performing functions of filtering oil and frying an ingredient, a controller 200 performing functions of setting and controlling automatic operation, and a housing 300 accommodating and supporting the body 100 and the controller 200.

The body 100 may comprise: an ingredient support unit 101; a frying oil container 103 into which the ingredient support unit 101 is to be contained; a heating unit 105 installed inside the frying oil container 103; an oil filtering container 107 located below the frying oil container 103; an oil discharging pipe 109 connecting and transferring oil from the frying oil container 103 to the oil filtering container 107; an oil level and filtration control valve 110 installed on the oil discharging pipe 109; a filtering device 111 installed inside the oil filtering container 107; a filtering paper 113 installed inside the oil filtering container 107 below the filtering device 111; an oil supplying pipe 115 connecting and transferring oil from the oil filtering container 107 to the frying oil container 103; an oil supplying pump 117 installed inside the oil supplying pipe 115; and a thermometer 119 and an oil level sensor 120 both installed inside the frying oil container 103. In addition, referring to FIGS. 7 and 8 together, the automatic oil filtering fryer 10 may further comprise an oil discharging pump 118 installed inside the oil discharging pipe 109 as shown in the automatic oil filtering fryer 20 in FIGS. 7 and 8.

Specifically, the ingredient support unit 101 may include an ingredient supporting part, a handle, and a hook. The ingredient supporting part is a part on which an ingredient is placed. The ingredient may be any kind of food including meat such as chicken, vegetable such as potato, dough, and a combination of any of them but is not limited thereto. The ingredient supporting part has a plurality holes so that oil enters inside and fries the ingredient. In some embodiments, the ingredient supporting part may be made of metal based wires and have a loose mesh shape. The supporting part of the food support unit 101 may have any one shape of a flat screen or a basket but is not limited thereto. The handle of the ingredient support unit 101 may be formed on at least one top edge of the ingredient support unit 101 and be configured to be gripped by a user so that the ingredient support unit 101 can be easily movable. The hook of the ingredient support unit 101 may be formed on at least one top edge of the ingredient support unit 101 and be configured to be hung on a head 305 of the housing 300.

The frying oil container 103 is filled with oil O0 and is a space where the ingredient support unit 101 is to be contained and where the ingredient is fried. The frying oil container 103 may be filled with oil by manual supply of new oil at the very initial step. Then, while discharging contaminated oil O0 having debris into the oil discharging pipe 109, the frying oil container 103 is filled with filtered oil O3 by automagical supply of filtered oil through an automatic oil filtering process of the automatic oil filtering fryer 10 described below.

The heating unit 105 is provided to heat the oil O0 and may be installed inside the frying oil container 103. In drawings, the heating unit 105 is positioned on a bottom side of the inside of the frying oil container 103 but may be positioned a lateral side of the inside thereof. In some embodiments, the heating unit 105 may be installed at an adjacent area to the frying oil container 103 outside the frying oil container 103.

The frying oil container 103 includes an outlet 103o to which the oil O0 in the frying oil container 103 is discharged. As the heated oil O0 fries the ingredient in the frying oil container 103, various debris with different sizes are occurred in the oil O0 by being fallen off the ingredient and/or chemical reactions between ingredient debris and the oil O0 and contaminate the oil O0. While the ingredient is fried, and the oil O0 is contaminated by the debris, the oil O0 in the frying oil container 103 is discharged from the frying oil container 103 into an oil discharging pipe 109 at a predetermined rate.

The oil discharging pipe 109 transfers the oil O0 discharged from the frying oil container 103 into the oil filtering container 107. The oil discharging pipe 109 may be further equipped with the oil level and filtration control valve 110 and the oil discharging pump 118 (See FIGS. 7 and 8).

The oil level and filtration control valve 110 installed on the oil discharging pipe 109 can control the oil O0 in the frying oil container 103 to be discharged. For the automatic oil filtering process, the oil level and filtration control valve 110 has to be maintained in an open state. Based on a desired filtering rate or speed of a user, the oil level and filtration control valve may be controlled to be open partially or entirely. Meanwhile, since the oil level and filtration control valve 110 also has an additional effect of controlling an oil level of the frying oil container 103, the oil level and filtration control valve 110 can prevent the oil O0 from overflowing from the frying oil container 103 as well as can control filtration of the oil O0 of the frying oil container 103.

In some embodiments, the automatic oil filtering fryer 10 may further comprise the oil level sensor 120 that is installed inside the frying oil container 103 and detects an oil level of the frying oil container 103. In this case, the oil level control valve 110 can control the oil level of the frying oil container 103 at a predetermined limit level LL, regardless of a volume of the ingredient contained in the frying oil container 103. That is, when the controller 200 receives oil level information that the oil level is about to exceed the predetermined limit level LL, from the oil level sensor 120, the controller 200 controls the oil level in the frying oil container 103 by opening the oil level and filtration control valve 110 to a higher degree or accelerating the oil discharging pump 118. Controls of the automatic oil filtering fryer 10 will be describe in more detail below.

Referring to FIGS. 7 and 8 together, if the automatic oil filtering fryer 10 further comprises the oil discharging pump 118 as shown the automatic oil filtering fryer 20 in FIGS. 7 and 8, the oil discharging pump 118 may be installed at a bottom side of the oil discharging pipe 109 and accelerate discharge of the oil O0 by pumping to induce the oil O0 to flow downward from the frying oil container 103 into the oil filtering container 107 through the oil discharging pipe 109. The oil discharging pump 118 may have a similar structure and function to the oil supplying pump 117, and thus, will be explained referring to FIGS. 4a and 4b. The oil discharging pump 118 may include: a motor 118m providing rotational power; a shaft 118s one end of which is connected to the motor 118m and rotates according to rotation of the motor 118m; a circular plate 118p connected to the other end of the shaft 118s and rotating according to rotation of the shaft 118s; and a plurality of blades 118b coupled onto the circular plate 118p. The circular plate 118p has a first surface and a second surface opposite to the first surface, and the shaft 118s is connected to the first surface of the circular plate 118p, and the plurality of blades 118b are fixedly coupled to the second surface of the circular plate 118p. Since the blades 118b are fixedly coupled to a surface of the circular plate 118p, noise, which may occur in a conventional pump, can be prevented, and the blades 118b can be prevented from being damaged due to low flow resistance. That is, since the blades 118b have a small area size facing the oil flow, collision between the blades 118b and oil can decrease, thereby lowering noise and impact that may cause damage in the blades 118b.

In this case, while the oil O0 comes downward through the oil discharging pipe 109 by the rotational power of the oil discharging pump 118, the plurality of rotating blades 118b pulverizes debris contained in the oil O0, and the oil O0 containing pulverized debris is supplied to the oil filtering container 107. The pulverized debris in the oil O0 prevents the oil discharging pipe 109, the filtering device 111, and the filtering paper 113 from heavy contamination and clogging and facilitate a filtering process. The filtering process will be described in more detail below. Meanwhile, as described above, the oil O0 containing pulverized debris enters to the oil filtering container 107. As shown in FIGS. 1 and 2, the oil discharging pump 118 may be omitted in some embodiments.

The oil filtering container 107 is located below the frying oil container 103 and receives the oil O0 discharged from the frying oil container 103 through the oil discharging pipe 109 and an inlet 109o. The oil filtering container 107 is a space where the oil O0 contaminated during the frying process and having debris is filtered.

The filtering device 111 is installed inside the oil filtering container 107 and configured to include a filtering mesh 111m and a frame 111f that surrounds an edge of the filtering mesh 111m to filter relatively big debris D1 contained in the oil O0, thereby forming a first filtered oil O1. In this case, the filtering mesh 111m is made of metal based wires, and the frame 111f is made of elvan to prevent the filtering mesh 111m from floating. In addition, a hole formed by adjacent wires of the filtering mesh 111m is bigger than a hole formed by adjacent fibers of the filtering paper 113. Accordingly, relatively big debris D1 in the oil O3 may be filtered by the filtering device 111 first. Since the filtering mesh 111m of the filtering device 111 is made of metal based wires, debris D1 filtered by and placed on the filtering mesh 111m can be easily removable. Therefore, the filtering device is permanently reusable after removing the filtered debris. Meanwhile, the first filtered oil O1 filtered through the filtering device 111 is placed above the filtering paper 113.

The filtering paper 113 may be installed to be located below the filtering device 111 inside the oil filtering container 107 and filter relatively small debris D2 contained in the first filtered oil O1, thereby forming second filtered oil O2. Since the relatively big debris D1 is already removed from the first filtered oil O1, and the filtering paper 113 only filters the relatively small debris D2, the filtering paper 113 is not clogged and can be used in a long term. As a result of a dual filtering process using the filtering device 111 and the filtering paper 113, the second filtered oil O2 can become clean oil in which almost all the debris are removed. However, there may be still fine debris D3 in the second filtered oil O2. These fine debris D3 contained in the second filtered oil O2 may be additionally processed by the oil supplying pump 117. This additional process by the oil supplying pump 117 will be described in more detail below. Meanwhile, the second filtered oil O2 flows into the oil supplying pipe 115 from the oil filtering container 107.

The oil supplying pipe 115 receives the second filtered oil O2 through an outlet 107o of the oil filtering container 107 and transfers the second filtered oil O2 into the frying oil container 103.

The oil supplying pump 117 may be installed inside the oil supplying pipe 115 and pump to raise the second filtered oil O2 upward from the oil filtering container 107, thereby supplying the second filtered oil O2 into the oil filtering container 107 through the oil supplying pipe 115. As described above in explanation of the oil discharging pump 118 of the automatic oil filtering fryer 20 of FIGS. 7 and 8, the oil supplying pump 117 enables automatic oil filtering circulation through the frying oil container 103, the oil discharging pipe 109, the oil filtering container 107, the filtering device 111, the filtering paper 113, the oil supplying pipe 115, and the frying oil container 103.

Meanwhile, as described above in explanation of the oil discharging pump 118, the oil supplying pump 117 may be configured to have a similar structure and function as the oil discharging pump 118. That is, referring to FIGS. 4a and 4b together, the oil supplying pump 117 includes: a motor 117m providing rotational power; a shaft 117s one end of which is connected to the motor 117m and rotates according to rotation of the motor 117m; a circular plate 117p connected to the other end of the shaft 117s and rotating according to rotation of the shaft 117s; and a plurality of blades 117b coupled onto the circular plate 117p. The circular plate 117p has a first surface and a second surface opposite to the first surface, and the shaft 117s is connected to the first surface of the circular plate 117p, and the plurality of blades 117b are fixedly coupled to the second surface of the circular plate 117p. Since the blades 117b are fixedly coupled to a surface of the circular plate 118p, noise, which may occur in a conventional pump, can be prevented, and the blades 117b can be prevented from being damaged due to low flow resistance. That is, since the blades 117b have a small area size facing the oil flow, collision between the blades 118b and oil can decrease, thereby lowering noise and impact that may cause damage in the blades 117b.

Meanwhile, referring to FIG. 5 together, while the second filtered oil O2 is raised upward through the oil supplying pipe 115 by rotational power of the oil supplying pump 117, the plurality of rotating blades 117b pulverizes remaining fine debris D3 contained in the second filtered oil O2 to powder P, thereby forming third filtered oil O3. The third filtered oil O3, which becomes clearly filtered oil via automatic triple filtering processes, is supplied to the frying oil container 103 through an inlet 103i and reused to fry the ingredient in the frying oil container 103.

The automatic oil filtering fryer 10 may further comprise the thermometer 119 installed inside the frying oil container 103 to measure temperature of the oil O0 in the frying oil container 103.

The controller 200 can set and control an operation of the automatic oil filtering fryer 10. The controller 200 may comprise: a control circuit 201 (See FIG. 6) and a control panel 203.

The control circuit 201 may receive temperature information, oil level information, oil level and filtration control valve information, heating unit information, oil discharging pump information, and oil supplying pump information, from a thermometer 119, the oil level sensor 120, the oil level and filtration control valve 110, the heating unit 105, the oil supplying pump 117, and the oil discharging pump 118, respectively, and transmit all the information to a control panel 203. The control circuit 201 can automatically control the oil level control valve 110, the heating unit 105, the oil supplying pump 117, and the oil discharging pump 118 according to predetermined settings. In addition, the user can see all the information a display 203a of the control panel 203 and can manually control the oil level control valve 110, the heating unit 105, the oil supplying pump 117, and the oil discharging pump 118 by manipulation of the control panel 203.

The control panel 203 may have the display 203a, a heating control unit 203b, a valve control unit 203c, a supplying pump control unit 203d, and a discharging pump control unit 203e, which enables the user to control the oil level control valve 110, the heating unit 105, the oil supplying pump 117, and the oil discharging pump 118 by manual manipulation.

The housing 300 comprises: a cover 301 accommodating the body 100 and the controller 200; legs 303 supporting the cover 301, the body 100, and the controller 200; and a head 305 on which the ingredient support unit 101 may be hung. In some embodiments, the legs 303 may be equipped with wheels (not shown), which enable the automatic oil filtering fryer 10 to be easily movable. In this case, the legs 303 may be equipped with stoppers (not shown), which prevents the wheels from rolling to fix the automatic oil filtering fryer 10 at a certain position.

As described above, the present invention provides the automatic oil filtering fryers 10, 20 that is configured to have a simple structure occupying a small space with an automatic oil refining function, thereby increasing user convenience and time efficiency, producing healthy and tasty food with clean cooking oil, reducing food producing cost, and preventing waste and environmental pollution.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. An automatic oil filtering fryer comprising:
   a frying oil container 103 that is filled with oil O0 and that an ingredient is to be contained into;
   a heating unit 105 installed inside the frying oil container 103 and heating the oil O0;
   an oil filtering container 107 located below the frying oil container 103 and receiving the oil O0 that is discharged from the frying oil container an oil discharging pipe 109;
   the oil discharging pipe 109 transferring the oil O0 discharged from the frying oil container 103 into the oil filtering container 107;
   a filtering device 111 that is installed inside the oil filtering container 107 and configured to include a filtering mesh 111m and a frame 111f that surrounds an edge of the filtering mesh 111m to filter first debris contained in the oil O0, thereby forming a first filtered oil O1;
   a filtering paper 113 that is installed inside the oil filtering container 107 and filters second debris contained in the first filtered oil O1, thereby forming second filtered oil O2; and
   an oil supplying pipe 115 transferring the second filtered oil O2 discharged from the oil filtering container 107 into the frying oil container 103,
   wherein the automatic oil filtering fryer further comprises an oil supplying pump 117 that is installed inside the oil supplying pipe 115 and that pumps to raise the second filtered oil O2 upward from the oil filtering container 107 and supplies the second filtered oil O2 into the oil filtering container 107 through the oil supplying pipe 115,
   wherein the oil supplying pump 117 includes:
   a motor 117m providing rotational power;
   a shaft 117s one end of which is connected to the motor 117m and rotates according to rotation of the motor 117m;
   a circular plate 117p connected to the other end of the shaft 117s and rotating according to rotation of the shaft 117s; and
   a plurality of blades 117b coupled onto the circular plate 117p,
   wherein the circular plate 117p has a first surface and a second surface opposite to the first surface, and
   wherein the shaft 117s is connected to the first surface of the circular plate 117p, and the plurality of blades 117b are fixedly coupled to the second surface of the circular plate 117p.

2. The automatic oil filtering fryer of claim 1, further comprising:
   an oil level and filtration control valve 110 that is installed on the oil discharging pipe 109 and controls the oil O0 in the frying oil container 103 to be discharged; and
   wherein the oil supplying pump 117 enables an automatic oil filtering circulation through the frying oil container 103, the oil discharging pipe 109, the oil filtering container 107, the filtering device 111, the filtering paper 113, the oil supplying pipe 115, and the frying oil container 103.

3. The automatic oil filtering fryer of claim 2, further comprising an oil discharging pump 118 that is installed inside the oil discharging pipe 109 and that pumps to induce the oil O0 to flow downward from the frying oil container 103 into the oil filtering container 107 through the oil discharging pipe 109, thereby enabling the automatic oil filtering circulation.

4. The automatic oil filtering fryer of claim 1, wherein the filtering mesh 111m is made of metal based wires and the frame 111f is made of elvan,
   wherein a hole formed by adjacent wires of the filtering mesh 111m is bigger than a hole formed by adjacent fibers of the filtering paper 113,
   wherein the filtering device 111 on which the first debris is removably placed is permanently reusable after removing the filtered first debris.

5. The automatic oil filtering fryer of claim 1, further comprising an oil level and filtration control valve 110 that is installed on the oil discharging pipe 109,
   wherein the oil level and filtration control valve 110 controls an oil level of the frying oil container 103 to prevent the oil O0 from overflowing from the frying oil container 103 and controls filtration of the oil O0 of the frying oil container 103.

6. The automatic oil filtering fryer of claim 5, further comprising an oil level sensor 120 that is installed inside the frying oil container 103 and detects an oil level of the frying oil container 103.

7. The automatic oil filtering fryer of claim 6, wherein the oil level control valve 110 controls the oil level of the frying oil container 103 at a predetermined limit level LL, regardless of a volume of the ingredient contained in the frying oil container 103.

8. The automatic oil filtering fryer of claim 1, wherein while the second filtered oil O2 is raised upward through the oil supplying pipe 115 by the rotational power of the oil supplying pump 117, the plurality of rotating blades 117b pulverizes third debris contained in the second filtered oil O2 to powder, thereby forming third filtered oil O3,
   wherein the third filtered oil O3 is supplied to the frying oil container 103.

9. An automatic oil filtering fryer comprising:
   a frying oil container 103 that is filled with oil O0 and that an ingredient is to be contained into;
   a heating unit 105 installed inside the frying oil container 103 and heating the oil O0;
   an oil filtering container 107 located below the frying oil container 103 and receiving the oil O0 that is discharged from the frying oil container 103 through an oil discharging pipe 109;
   the oil discharging pipe 109 transferring the oil O0 discharged frying oil container 103 into the oil filtering container 107;
   a filtering device 111 that is installed inside the oil filtering container 107 and configured to include a filtering mesh 111m and a frame 111f that surrounds an edge of the filtering mesh 111*m* to filter first debris contained in the oil O0, thereby forming a first filtered oil O1;

a filtering paper 113 that is installed inside the oil filtering container 107 and filters second debris contained in the first filtered oil O1, thereby forming second filtered oil O2; and an oil supplying pipe 115 transferring the second filtered oil O2 discharged from the oil filtering container 107 into the frying oil container 103, wherein the automatic oil filtering fryer further comprises an oil discharging pump 118 that is installed inside the oil discharging pipe 109 and that pumps to induce the oil O0 to flow downward from the frying oil container 103 into the oil filtering container 107 through the oil discharging pipe 109, and wherein the oil discharging pump 118 includes:

a motor 118*m* providing rotational power;

a shaft 118*s* one end of which is connected to the motor 118*m* and rotates according to rotation of the motor 118*m*;

a circular plate 118*p* connected to the other end of the shaft 118*s* and rotating according to rotation of the shaft 118*s*; and a plurality of blades 118*b* coupled onto the circular plate 118*p*, wherein while the oil O0 comes downward through the oil discharging pipe 109 by the rotational power of the oil discharging pump 118, the plurality of rotating blades 118*b* pulverizes debris contained in the oil O0, wherein the oil O0 containing pulverized debris is supplied to the oil filtering container 107.

10. An automatic oil filtering fryer comprising:

a frying oil container 103 that is filled with oil O0 and that an ingredient is to be contained into;

a heating unit 105 installed inside the frying oil container 103 and heating the oil O0;

an oil filtering container 107 located below the frying oil container 103 and receiving the oil O0 that is discharged from the frying oil container 103 through an oil discharging pipe 109;

the oil discharging pipe 109 transferring the oil O0 discharged from the frying oil container 103 into the oil filtering container 107;

a filtering device 111 that is installed inside the oil filtering container 107 and configured to include a filtering mesh 111*m* and a frame 111*f* that surrounds an edge of the filtering mesh 111*m* to filter first debris contained in the oil O0, thereby forming a first filtered oil O1;

a filtering paper 113 that is installed inside the oil filtering container 107 and filters second debris contained in the first filtered oil O1, thereby forming second filtered oil O2; and an oil supplying pipe 115 transferring the second filtered oil O2 discharged from the oil filtering container 107 into the frying oil container 103, wherein the automatic oil filtering fryer further comprises a thermometer 119 and an oil level sensor 120 both installed inside the frying oil container 103; an oil level and filtration control valve 110 installed on the oil discharging pipe 109; an oil discharging pump 118 installed inside the oil discharging pipe 109 and pumping to induce the oil O0 to flow downward; and an oil supplying pump 117 installed inside the oil supplying pipe 115 and pumping to raise the second filtered oil O2 upward, and wherein the automatic oil filtering fryer further comprises a controller 200 including:

a control circuit 201 that receives temperature information in the frying oil container 103, oil level information in the frying oil container 103, oil level and filtration control valve information, heating unit information, oil discharging pump information, and oil supplying pump information, from a thermometer 119, the oil level sensor 120, the oil level and filtration control valve 110, the heating unit 105, and the oil supplying pump 117, and the oil discharging pump 118, respectively, that transmits all the information to a control panel 203, and that controls the oil level control valve 110, the heating unit 105, the oil supplying pump 117, and the oil discharging pump 118 automatically according to predetermined settings or manually according to manipulation of the control panel 203 by a user, and the control panel 203 that has a display 203*a* displaying the all the information, a heating control unit 203*b*, a valve control unit 203*c*, a supplying pump control unit 203*d*, and a discharging pump control unit 203*e*, which enables a user to control the oil level control valve 110, the heating unit 105, the oil supplying pump 117, and the oil discharging pump 118 by manual manipulation thereof.

11. An automatic oil filtering fryer comprising:

a frying oil container 103 that is filled with oil O0 and that an ingredient is to be contained into;

a heating unit 105 heating the oil O0;

an oil filtering container 107 receiving the oil O0 discharged from the frying oil container 103 through an oil discharging pipe 109;

an oil level and filtration control valve 110 that is installed on the oil discharging pipe 109 and controls the oil O0 in the frying oil container 103 to be discharged;

an oil level sensor 120 that is installed inside the frying oil container 103 and detects an oil level of the frying oil container 103;

a filtering device 111 that is installed inside the oil filtering container 107 and configured to include a filtering mesh 111*m* to filter debris contained in the oil O0, thereby forming a first filtered oil O1;

a filtering paper 113 that is installed inside the oil filtering container 107 and filters remaining debris contained in the first filtered oil O1, thereby forming second filtered oil O2; and an oil supplying pipe 115 transferring the second filtered oil O2 into the frying oil container 103, wherein the oil level control valve 110 controls the oil level of the frying oil container 103 at a predetermined limit level LL, regardless of a volume of the ingredient contained in the frying oil container 103, to prevent the oil O0 from overflowing from the frying oil container 103 and controls filtration of the oil O0 of the frying oil container 103, and wherein the automatic oil filtering fryer further comprises an oil supplying pump 117 that is installed inside the oil supplying pipe 115 and that pumps to raise the second filtered oil O2 upward, thereby enabling automatic oil filtering circulation through the frying oil container 103, the oil discharging pipe 109, the oil filtering container 107, the filtering device 111, the filtering paper 113, the oil supplying pipe 115, and the frying oil container 103, wherein the oil supplying pump 117 includes:
a motor 117m providing rotational power;
a shaft 117s one end of which is connected to the motor 117m and rotates according to rotation of the motor 117m;
a circular plate 117p connected to the other end of the shaft 117s and rotating according to rotation of the shaft 117s; and
a plurality of blades 117b coupled onto the circular plate 117p,
wherein while the second filtered oil O2 is raised upward through the oil supplying pipe 115 by the rotational power of the oil supplying pump 117, the plurality of rotating blades 117b pulverizes third debris contained in the second filtered oil O2 to powder, thereby forming third filtered oil O3,
wherein the third filtered oil O3 is supplied to the frying oil container 103.

12. An automatic oil filtering fryer comprising:
a frying oil container 103 that is filled with oil O0 and that an ingredient is to be contained into;
a heating unit 105 heating the oil O0;
an oil filtering container 107 receiving the oil O0 discharged from the frying oil container 103 through an oil discharging pipe 109;
an oil level and filtration control valve 110 that is installed on the oil discharging pipe 109 and controls the oil O0 in the frying oil container 103 to be discharged;
an oil level sensor 120 that is installed inside the frying oil container 103 and detects an oil level of the frying oil container 103;
a filtering device 111 that is installed inside the oil filtering container 107 and configured to include a filtering mesh 111m to filter debris contained in the oil O0, thereby forming a first filtered oil O1;
a filtering paper 113 that is installed inside the oil filtering container 107 and filters remaining debris contained in the first filtered oil O1, thereby forming second filtered oil O2; and
an oil supplying pipe 115 transferring the second filtered oil O2 into the frying oil container 103,
wherein the oil level control valve 110 controls the oil level of the frying oil container 103 at a predetermined limit level LL, regardless of a volume of the ingredient contained in the frying oil container 103, to prevent the oil O0 from overflowing from the frying oil container 103 and controls filtration of the oil O0 of the frying oil container 103, and wherein the automatic oil filtering fryer further comprises an oil discharging pump 118 that is installed inside the oil discharging pipe 109 and that pumps to induce the oil O0 to flow downward from the frying oil container 103 into the oil filtering container 107 through the oil discharging pipe 109,
wherein the oil discharging pump 118 includes:
a motor 118m providing rotational power;
a shaft 118s one end of which is connected to the motor 118m and rotates according to rotation of the motor 118m;
a circular plate 118p connected to the other end of the shaft 118s and rotating according to rotation of the shaft 118s; and
a plurality of blades 118b coupled onto the circular plate 118p,
wherein while the oil O0 comes downward through the oil discharging pipe 109 by the rotational power of the oil discharging pump 118, the plurality of rotating blades 118b pulverizes debris contained in the oil O0,
wherein the oil O0 containing pulverized debris is supplied to the oil filtering container 107.

13. An automatic oil filtering fryer comprising:
a frying oil container 103 that is filled with oil O0 and that an ingredient is to be contained into;
a heating unit 105 heating the oil O0;
an oil filtering container 107 receiving the oil O0 discharged from the frying oil container 103 through an oil discharging pipe 109;
an oil discharging pump 118 that is installed inside the oil discharging pipe 109 and that pumps to induce the oil O0 to flow downward from the frying oil container 103 into the oil filtering container 107 through the oil discharging pipe 109;
a filtering device 111 that is installed inside the oil filtering container 107 and configured to include a filtering mesh 111m to filter debris contained in the oil O0, thereby forming a first filtered oil O1;
a filtering paper 113 that is installed inside the oil filtering container 107 and filters remaining debris contained in the first filtered oil O1, thereby forming second filtered oil O2;
an oil supplying pipe 115 transferring the second filtered oil O2 into the frying oil container 103; and
an oil supplying pump 117 that is installed inside the oil supplying pipe 115 and that pumps to raise the second filtered oil O2 upward, thereby enabling automatic oil filtering circulation through the frying oil container 103, the oil discharging pipe 109, the oil filtering container 107, the filtering device 111, the filtering paper 113, the oil supplying pipe 115, and the frying oil container 103, and
wherein each of the oil discharging pump 118 and the oil supplying pump 117 respectively includes:
a motor 118m, 117m providing rotational power;
a shaft 118s, 117s one end of which is connected to the motor 118m, 117m and rotates according to rotation of the motor 118m, 117m;
a circular plate 118p, 117p connected to the other end of the shaft 118s, 117s and rotating according to rotation of the shaft 118s, 117s; and
a plurality of blades 118b, 117b coupled onto the circular plate 118p, 117p,
wherein while the oil O0 comes downward through the oil discharging pipe 109 by the rotational power of the oil discharging pump 118, the plurality of rotating blades 118b pulverizes debris contained in the oil O0,
wherein the oil O0 containing pulverized debris is supplied to the oil filtering container 107,
wherein while the second filtered oil O2 is raised upward through the oil supplying pipe 115 by the rotational power of the oil supplying pump 117, the plurality of rotating blades 117b pulverizes third debris contained in the second filtered oil O2 to powder, thereby forming third filtered oil O3,
wherein the third filtered oil O3 is supplied to the frying oil container 103.

14. The automatic oil filtering fryer of claim 13, further comprising:
an oil level and filtration control valve 110 that is installed on the oil discharging pipe 109 and controls the oil O0 in the frying oil container 103 to be discharged; and
an oil level sensor 120 that is installed inside the frying oil container 103 and detects an oil level of the frying oil container 103.

* * * * *